US012623667B2

(12) United States Patent (10) Patent No.: US 12,623,667 B2

Ang et al. (45) Date of Patent: May 12, 2026

(54) DRIVER MONITORING CAMERA

(71) Applicant: Continental Automotive Technologies GmbH, Hannover (DE)

(72) Inventors: Kah Soon Ang, Singapore (SG); Florin Burza, Timisoara (RO)

(73) Assignee: Continental Automotive Technologies GmbH, Hannover (DE)

( * ) Notice: Subject to any disclaimer, the term of this patent is extended or adjusted under 35 U.S.C. 154(b) by 158 days.

(21) Appl. No.: 18/048,077

(22) Filed: Oct. 20, 2022

(65) Prior Publication Data

US 2023/0127266 A1 Apr. 27, 2023

(30) Foreign Application Priority Data

Oct. 22, 2021 (EP) ..................................... 21465553

(51) Int. Cl.
*B60W 40/08* (2012.01)
*G06V 20/59* (2022.01)

(52) U.S. Cl.
CPC ........... *B60W 40/08* (2013.01); *G06V 20/597* (2022.01); *B60W 2420/403* (2013.01); *B60W 2540/223* (2020.02)

(58) Field of Classification Search
None
See application file for complete search history.

(56) References Cited

U.S. PATENT DOCUMENTS 10,520,224 B2 * 12/2019 Linderman ............. F24S 50/80
2006/0082657 A1 4/2006 Meier

| 2007/0222285 A1 * | 9/2007 | Ribbens ................ B60T 8/1703 |
| | | 303/139 |
| 2010/0002075 A1 * | 1/2010 | Jung ...................... B60K 28/06 |
| | | 348/78 |
| 2011/0187854 A1 | 8/2011 | Chung |
| 2012/0002028 A1 | 1/2012 | Takahashi et al. |
| 2014/0107471 A1 | 4/2014 | Haider et al. |
| 2020/0134870 A1 | 4/2020 | Ban |

FOREIGN PATENT DOCUMENTS

| CN | 107667036 | | 2/2018 |
| CN | 111291607 | * | 6/2020 |
| EP | 1517550 A2 | | 3/2005 |
| EP | 3076656 A1 | | 10/2016 |

(Continued)

OTHER PUBLICATIONS

EP Examination report dated Jan. 30, 2024 of the counterpart Europan Application 21465553.2.

(Continued)

*Primary Examiner* — Hongye Liang

(74) *Attorney, Agent, or Firm* — COZEN O'CONNOR

(57) ABSTRACT

A driver monitoring camera comprises an optical sensor configured to take an image of a driver of a vehicle, an inclination sensor configured to determine an inclination of the driver monitoring camera with respect to a vehicle coordinate system and a processor configured to determine a pose of the driver in a driver monitoring camera coordinate system from the image and configured to transform the pose of the driver in the driver monitoring camera coordinate system to a pose of the driver in the vehicle coordinate system using the determined inclination.

13 Claims, 4 Drawing Sheets

(56)        References Cited

FOREIGN PATENT DOCUMENTS

| | | | |
|----|----|----|--------|
| GB | 2332051 | A | 6/1999 |
| GB | 2558653 | A | 7/2018 |
| JP | 2009008577 | A | 1/2009 |

OTHER PUBLICATIONS

European Search Report dated Apr. 20, 2022 for the counterpart European Patent Application No. 21465553.2.
EP Search Report dated Aug. 19, 2025 based on EP Application No. 21465553.2 filed Oct. 22, 2021.

\* cited by examiner

DRIVER MONITORING CAMERA

CROSS-REFERENCE TO RELATED APPLICATIONS

The present application claims the benefit and/or priority of European Patent Application No. 21465553.2 filed on Oct. 22, 2021, the content of which is incorporated by reference herein.

TECHNICAL FIELD

The present invention relates to driver monitoring cameras.

BACKGROUND

In a vehicle, a driver monitoring camera may be used to monitor the driver and, by determining the pose of the driver, for example determine whether the driver is distracted or tired. A good place for a driver monitoring camera is the steering column because the driver typically adjusts the steering wheel such that the drivers head is in the field of view of a driver monitoring camera mounted to the steering column. However, this means that the position of the driving monitoring camera changes when the driver adjusts the steering wheel. This needs to be taken into account when determining the driver's pose.

Image analysis may be used to compute the tilt angle of camera relative to world coordinate (in this case, the vehicle coordinate) via a transformation matrix. Image analysis of environmental components in camera coordinate system is correlated to the estimated tilt angle after the steering column tilt angle is adjusted.

However, image analysis is dependent on known and predictable features, such as straight edges projected onto image plane, otherwise inaccuracies will be high. Accordingly, the lack of vehicle interior landmarks limits the ability of the driver monitoring camera to judge its position relative to the vehicle coordinate when it is moved. One such situation is if the camera is used in a convertible car with the roof removed and thus the number of vehicle interior landmarks is limited since most of the landmarks are situated on the roof. Moreover, image analysis driver monitoring for determining the camera position camera is computationally expensive (high computation resource consumption, in particular when the image analysis needs to function in case of a lack of clear vehicle landmarks). Since it is not known when the driver will adjust the steering column tilt, the camera position determination typically needs to run continuously and thus continuously occupies computational resources.

SUMMARY

Hence, the provision of efficient approaches which allow taking into account a change of position of a driver monitoring camera in case of a lack of vehicle landmarks is needed.

Accordingly, a vehicle cabin sensing system includes an optical sensor configured to take an image of a driver of a vehicle, an inclination sensor configured to determine an inclination of the driver monitoring camera with respect to a vehicle coordinate system and a processor configured to determine a pose of the driver in a driver monitoring camera coordinate system from the image and configured to transform the pose of the driver in the driver monitoring camera coordinate system to a pose of the driver in the vehicle coordinate system using the determined inclination.

According to one embodiment, the processor is configured to perform a control action depending on the pose of the driver in vehicle coordinate system.

According to one embodiment, the optical sensor is configured to take a sequence of images of the driver of the vehicle, wherein the inclination sensor is configured to monitor the inclination of the driver monitoring camera with respect to the vehicle coordinate system and repeatedly indicate the inclination of the driver monitoring camera with respect to the vehicle coordinate system to the processor and wherein the processor is configured to determine a pose of the driver in a driver monitoring camera coordinate system from each image of the sequence of images and is configured to transform the pose of the driver in the driver monitoring camera coordinate system to a pose of the driver in the vehicle coordinate system using a first inclination indicated by the inclination sensor until the inclination sensor indicates a second inclination which is different from the first inclination by more than a predetermined threshold and then to transform the pose of the driver in the driver monitoring camera coordinate system to a pose of the driver in the vehicle coordinate system using the second inclination.

According to one embodiment, the sensor is configured to only indicate the second indication if it is different from the first indication by more than the predetermined threshold.

According to one embodiment, the processor is configured to determine a transformation matrix from the determined inclination and transform the pose of the driver in the driver monitoring camera coordinate system to the pose of the driver in the vehicle coordinate system using the transformation matrix.

According to one embodiment, the sensor is configured to trigger an update of the rotation matrix by signalling a changed inclination of the driver monitoring camera with respect to a vehicle coordinate system.

According to one embodiment, the processor is configured to determine a transformation matrix from the determined inclination and transform the pose of the driver in the driver monitoring camera coordinate system to the pose of the driver in the vehicle coordinate system using the transformation matrix and wherein the processor is configured to update a current transformation matrix if a change of inclination from a first inclination based on which the processor has determined the current transformation matrix to a second inclination determined by the inclination sensor is above a predetermined threshold.

According to one embodiment, the driver monitoring camera comprises a housing holding the optical sensor and the inclination sensor.

According to one embodiment, housing further holds the processor.

According to one embodiment, a vehicle is provided comprising a driver monitoring camera as described above.

According to one embodiment, the driver monitoring camera is mounted on a steering column of the vehicle.

According to one embodiment, the vehicle is a convertible.

BRIEF DESCRIPTION OF THE DRAWINGS

The embodiments will be described in more detail in the following with reference to the accompanying drawings.

DETAILED DESCRIPTION

Figure 1:
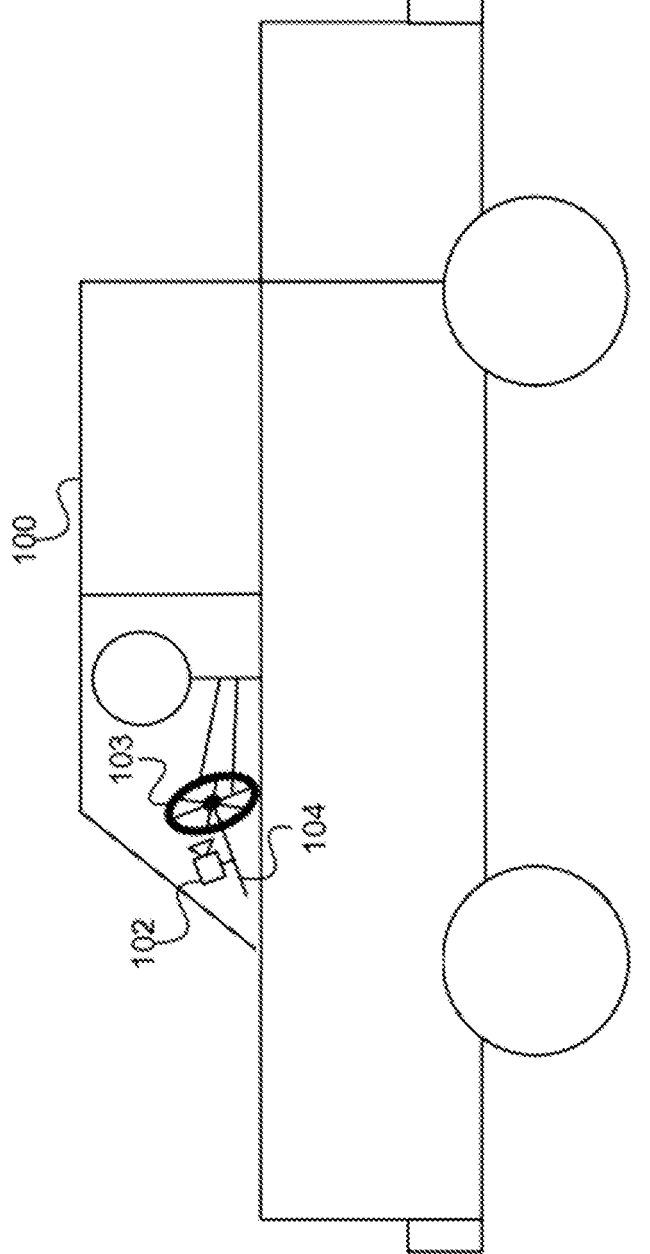
FIG. 1 shows a vehicle.

FIG. 1 shows a vehicle 100.

A driver 101 is driving the vehicle 100.

For various reasons, it may be desired to monitor the driver 101. For example, it may be desirable to detect when the driver gets sleepy or when the driver 101 is distracted (e.g. uses a mobile phone during driving). Monitoring the driver 101 may for example determine a pose (position and orientation) of the driver 101 (i.e. position and orientation of body parts of the driver like arms and head). This may also be used for adjustment of the vehicle such as automatic positioning of the driver's headrest.

For this, a driving monitoring system may be provided which includes a driver monitoring camera (DMC) 102 which takes images of the driver 101 and for example allows determining a pose of the driver. A pose may include that the driver 101 raises a telephone to his hear or that his head is turned (and thus is distracted), that the driver hangs his head (which might be a sign of the driver being sleepy).

The DMC 102 is mounted in a location in the vehicle 102 where the driver's eyes and face are visible during operation, and minimally occluded by other components in its line of sight, such as by the steering wheel 103. One of the potential locations is on the steering column 104, where the steering wheel 103 is mounted on. The steering column 104 is typically adjustable in two directions: by tilting up and down and by translating towards and away from driver (referred here as towards and away respectively).

The image that the DMC 102 takes of the driver depends, for example, on the inclination of the DMC 102 and thus, if it is mounted on an adjustable steering column 104, on the position of the steering column 104.

According to various embodiments, a tilt sensor, also denoted as inclinometer or clinometer, is incorporated into the DMC 102. This allows taking into account the position of the steering column 104 when monitoring the driver.

Figure 2:
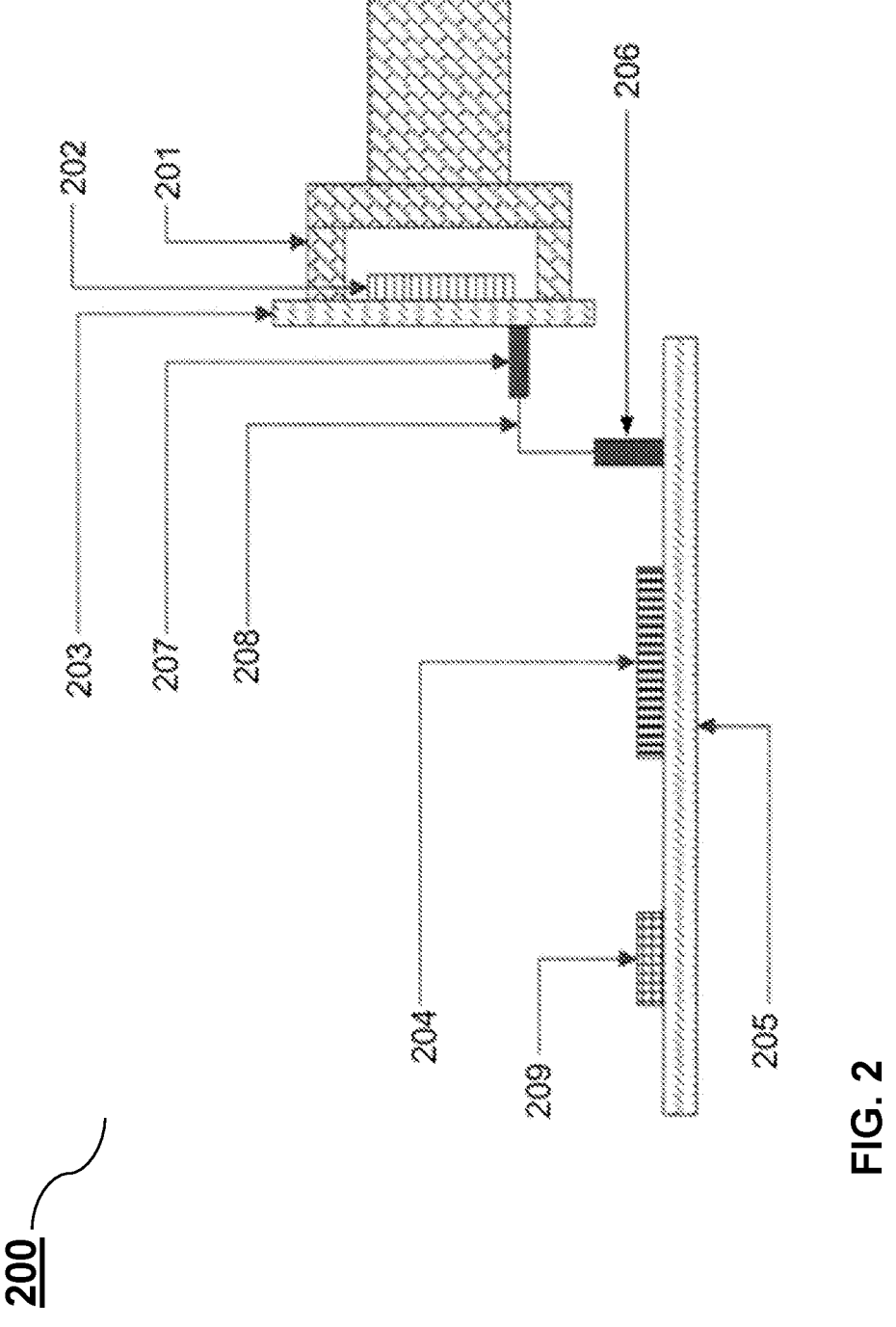
FIG. 2 shows a driver monitoring camera.

FIG. 2 shows a driver monitoring camera 200.

The driver monitoring camera (DMC) 200 contains an optical module and a processing unit. The optical module consists of components required for imaging, including lens stack 201 and an image sensor (i.e. optical sensor) 202 mounted on a camera printed circuit board (PCB) 203 which may hold further components like an illuminator.

The processing unit consists of components required for processing and analyzing an image acquired by the optical module, including a microprocessor 204 on a processor PCB 205 which may hold other components like a memory and additional components required to support the function of a camera, such as power supply, regulator and drivers.

The optical module PCB 203 and the processor PCB 205 each comprise a respective connector 206, 207 via which they are interconnected, e.g. by a wire or flexible circuit connection 208 which electrically couples the two connectors 206, 207.

In the embodiment of FIG. 2, an inclinometer 209 is mounted on the processor PCB 205.

The inclinometer 209 is a sensor that can measure the angle of a measured plane relative to a reference plane (e.g. ground plane or horizontal plane; here of the vehicle coordinate system). Although the embodiment shows the inclinometer 209 as a separate and individual component, it is possible for it to be included as a feature in a sensor module, e.g. placed on the camera PCB 203.

In the embodiment of FIG. 2, the inclinometer 209 is connected to the microprocessor 204 and sends an inclination value to the microprocessor 204 as a signal. Filtering of the signal can be performed to eliminate or reduce influence of noise and jitter on the signal. This can be implemented in a sensor module containing the inclinometer 209 or in the microprocessor 204 through hardware means or through software means. Filtering may for example comprise that a change of the determined inclination is only considered if it is sufficiently high (above a predetermined threshold of e.g. a few degrees).

Figure 3:
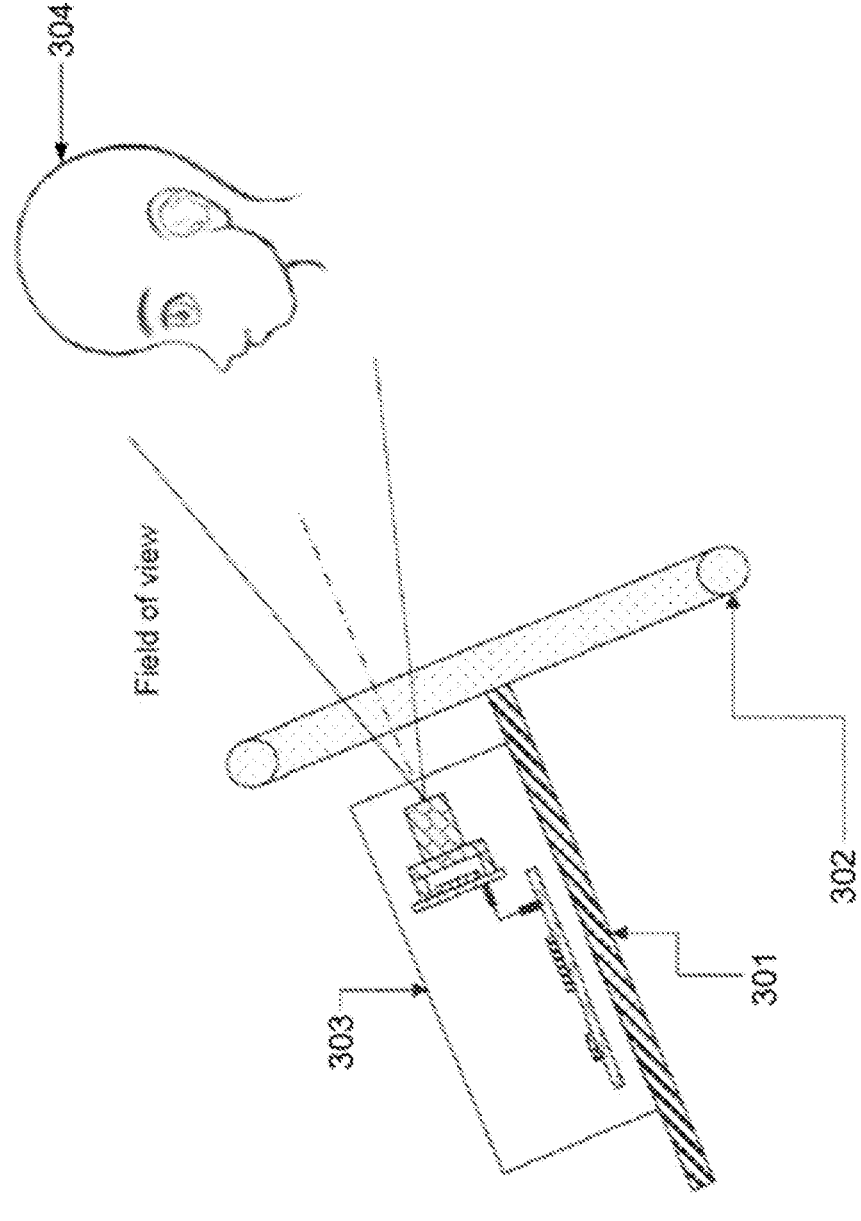
FIG. 3 illustrates the placement of the driver monitoring camera of FIG. 2 on a steering column.

FIG. 3 illustrates the placement of the driver monitoring camera of FIG. 2 on a steering column 301.

The steering column 301 for example corresponds to the steering column 104. A steering wheel 302 (e.g. corresponding to steering wheel 103) is attached to the steering column 301.

The driver monitoring camera is arranged in a camera housing 303 which is attached to the steering column 301.

Thus, when the driver 304 tilts the steering column 301, the driver monitoring camera is tilted with it and the inclinometer 209 outputs a corresponding sensor signal representing (and thus indicating) the tilting angle.

Figure 4:
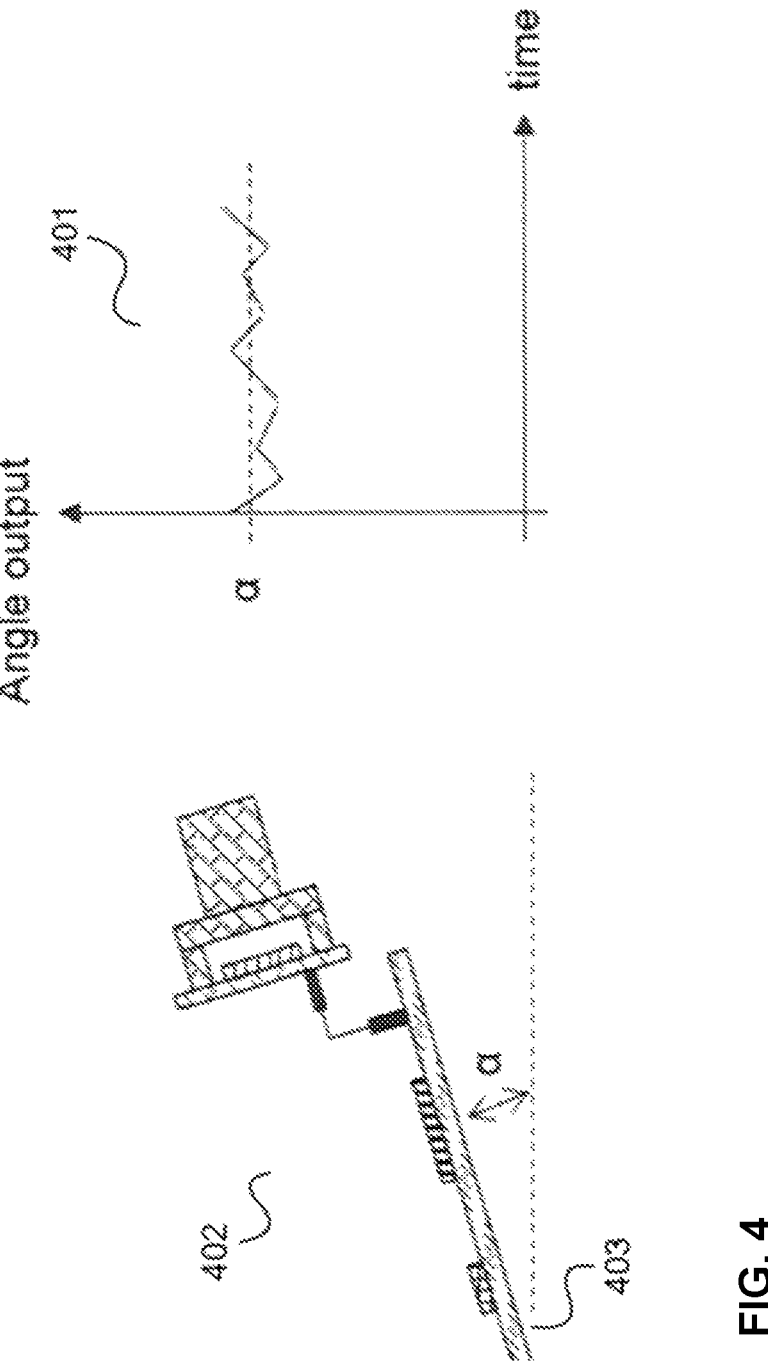
FIG. 4 illustrates the output of a sensor signal representing a tilting angle of a driver monitoring camera.

FIG. 4 illustrates, in a diagram 401, the output of a sensor signal representing the tilting angle, denoted by a, of the driver monitoring camera 402. The pivot point 403 is here at the left end of the driver monitoring camera 402 but it may be further a depending on where the driver monitoring camera housing 303 is placed on the steering column 301.

Thus, by means of the inclinometer 209, the driver monitoring camera 200 (specifically microprocessor 204) recognizes its position and orientation relative to the world coordinate system, in this case the vehicle coordinate system. The microprocessor 204 expresses the driving monitoring camera's position and orientation (i.e. the camera coordinate system) relative to the world coordinate system through extrinsic camera parameters, e.g. in the form of a matrix. By the extrinsic camera parameters, the camera coordinate system is transformed to the world coordinate system. Thus, the microprocessor 204 may detect features representing a driver pose in the camera coordinate system (from an image taken by the driver monitoring camera) and can then map it to the vehicle coordinate system.

The extrinsic camera parameters include for example a rotation matrix, which specifies the orientation of the camera (and thus the camera coordinate system which is fixed to the camera) in the vehicle coordinate system. The extrinsic camera parameters are for example stored in a memory and used by the microprocessor 204 according to various algorithms such as for determining the face direction of the driver 304 in vehicle coordinate system after determining it in camera coordinate system from image analysis. The microprocessor 204 may use the extrinsic camera parameters in conjunction with other parameters, e.g. with intrinsic camera parameter to form a camera matrix which it then uses to map features in camera coordinate system to the vehicle coordinate system.

Since the steering column is not expected to be tilted often, the microprocessor 204 may be configured (e.g. by running corresponding software) to update the rotation matrix only when certain conditions are met. For example, an update is triggered when a change in tilt value of more than a threshold has occurred (since the last update of the rotations matrix), so that the rotation matrix determination is not overly sensitive and its update for example triggered due to noise or vibration.

The approaches described above allow a driving monitoring system to determine a driver pose in vehicle coordinate system also in the case when there is a lack of vehicle interior landmarks (like in a convertible car with the roof removed) since the inclination detection (i.e. determination of camera tilt) does not depend on the analysis of known features (like in the vehicle roof). Moreover, computationally expensive image analysis for detecting such features and determining their position via image analysis is not required with the above approaches.

They may also be applied in vehicles with fixed roof where an additional signal from the vehicle to inform the camera of its position is not available. Such cases could arise from the fact that sensors that can detect or measure positional and angular changes are not available on steering column, steering wheel or their associated parts.

The invention claimed is:

1. A driver monitoring camera mounted directly on a steering column of a vehicle, said driver monitoring camera comprising:

an optical sensor mounted on a camera printed circuit board and surrounded by a lens stack, said optical sensor being configured to obtain a sequence of images of a driver of the vehicle;

an inclination sensor mounted on a processor printed circuit board, said inclination sensor being configured to determine an inclination value of the driver monitoring camera with respect to a vehicle coordinate system; and a processor mounted on the processor printed circuit board, said processor being in operative communication with the optical sensor and the inclination sensor via first and second connectors which interconnect the camera printed circuit board and the processor printed circuit board;

wherein the inclination sensor is further configured to monitor the inclination value of the driver monitoring camera with respect to the vehicle coordinate system and repeatedly indicate the inclination value of the driver monitoring camera with respect to the vehicle coordinate system to the processor via a signal which is filtered to eliminate or reduce an influence of jitter on the signal;

wherein the processor is further configured to determine a pose of the driver in a driver monitoring camera coordinate system from each image of the sequence of images and is further configured to transform the pose of the driver in the driver monitoring camera coordinate system to a pose of the driver in the vehicle coordinate system via a first inclination value indicated by the inclination sensor until the inclination sensor indicates a second inclination value which is different from the first inclination value by more than a predetermined threshold and to subsequently transform the pose of the driver in the driver monitoring camera coordinate system to the pose of the driver in the vehicle coordinate system via the second inclination value; and wherein the processor is further configured to perform a control action depending on a determined pose of the driver of the vehicle; and wherein the driver monitoring camera determines the pose of the driver in the vehicle coordinate system when vehicle interior landmarks are unavailable.

2. The driver monitoring camera claim 1, wherein the processor is further configured to determine a transformation matrix from the determined inclination value and transform the pose of the driver in the driver monitoring camera coordinate system to the pose of the driver in the vehicle coordinate system via the transformation matrix.

3. The driver monitoring camera of claim 2, wherein the inclination sensor is further configured to trigger an update of the transformation matrix by signaling a changed inclination value of the driver monitoring camera with respect to the vehicle coordinate system.

4. The driver monitoring camera of claim 1, wherein the processor is further configured to determine a transformation matrix from the determined inclination value and transform the pose of the driver in the driver monitoring camera coordinate system to the pose of the driver in the vehicle coordinate system via the transformation matrix; and wherein the processor is further configured to update a current transformation matrix when a change of value from the first inclination value based on which the processor has determined the current transformation matrix to the second inclination value determined by the inclination sensor is above a predetermined threshold.

5. The driver monitoring camera of claim 1, further comprising:

a housing holding the optical sensor and the inclination sensor.

6. The driver monitoring camera of claim 5, wherein the housing further holds the processor.

7. A vehicle comprising:

a driver monitoring camera mounted directly on a steering column of the vehicle, the driver monitoring camera including:

an optical sensor mounted on a camera printed circuit board and surrounded by a lens stack, said optical sensor being configured to obtain a sequence of images of a driver of the vehicle;

an inclination sensor mounted on a processor printed circuit board, said inclination sensor being configured to determine an inclination value of the driver monitoring camera with respect to a vehicle coordinate system; and a processor mounted on the processor printed circuit board, said processor being in operative communication with the optical sensor and the inclination sensor via first and second connectors which interconnect the camera printed circuit board and the processor printed circuit board;

wherein the inclination sensor is further configured to monitor the inclination value of the driver monitoring camera with respect to the vehicle coordinate system and repeatedly indicate the inclination value of the driver monitoring camera with respect to the vehicle coordinate system to the processor via a signal which is filtered to eliminate or reduce an influence of jitter on the signal;

wherein the processor is further configured to determine a pose of the driver in a driver monitoring camera coordinate system from each image of the sequence of images and is further configured to transform the pose of the driver in the driver monitoring camera coordinate system to a pose of the driver in the vehicle coordinate system via a first inclination value indicated by the inclination sensor until the inclination sensor indicates a second inclination value which is different from the first inclination value by more than a predetermined threshold and to subsequently transform the pose of the driver in the driver monitoring camera coordinate system to a pose of the driver in the vehicle coordinate system via the second inclination value;

wherein the processor is further configured to perform a control action depending on a determined pose of the driver in the vehicle coordinate system; and wherein the driver monitoring camera determines the pose of the driver in the vehicle coordinate system when vehicle interior landmarks are unavailable.

8. The vehicle of claim 7, wherein the vehicle is a convertible.

9. The vehicle of claim 7, wherein the processor is further configured to determine a transformation matrix from the determined inclination value and transform the pose of the driver in the driver monitoring camera coordinate system to the pose of the driver in the vehicle coordinate system via the transformation matrix.

10. The vehicle of claim 9, wherein the inclination sensor is further configured to trigger an update of the rotation matrix by signaling a changed inclination value of the driver monitoring camera with respect to the vehicle coordinate system.

11. The vehicle of claim 7, wherein the processor is further configured to determine a transformation matrix from the determined inclination value and transform the pose of the driver in the driver monitoring camera coordinate system to the pose of the driver in the vehicle coordinate system via the transformation matrix; and wherein the processor is further configured to update a current transformation matrix when a change of inclination from the first inclination based on which the processor has determined the current transformation matrix to the second inclination determined by the inclination sensor is above a predetermined threshold.

12. The vehicle of claim 7, further comprising:
a housing holding the optical sensor and the inclination sensor.

13. The vehicle of claim 12, wherein the housing further holds the processor.

* * * * *